Aug. 24, 1965 H. R. EADY, JR., ETAL 3,202,968
SIGNAL MONITORING INSTRUMENT
Filed Aug. 25, 1961 2 Sheets-Sheet 2
FIG. 4
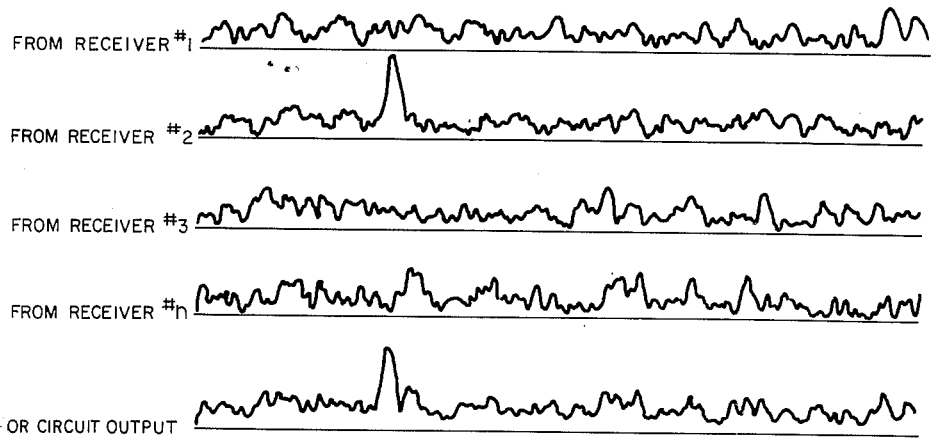
FIG. 5
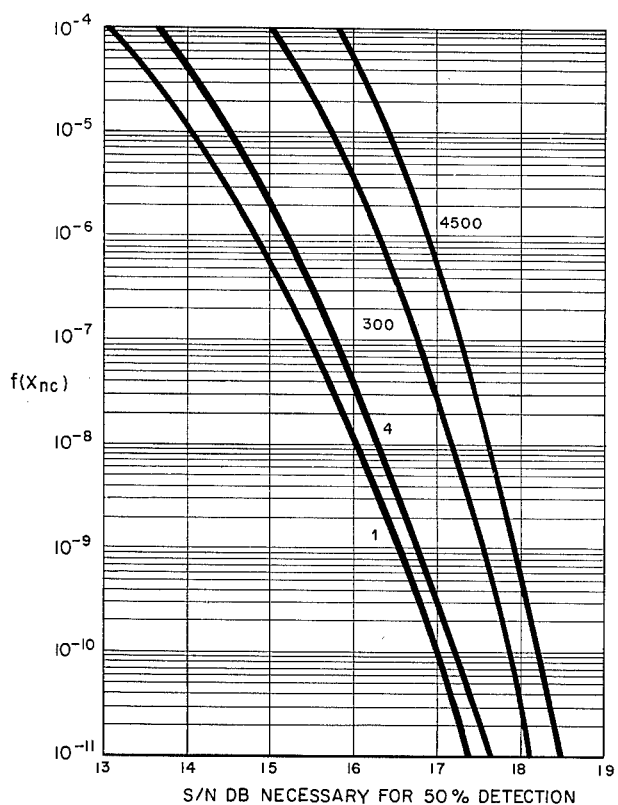
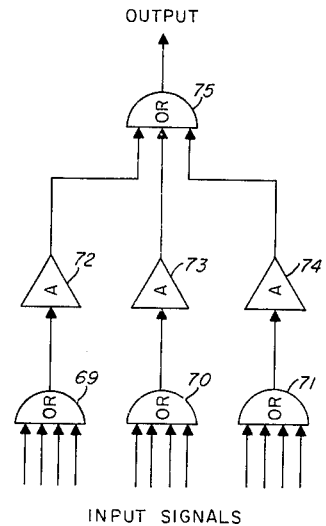
FIG. 6
INVENTORS
HERMAN R. EADY, JR.
PAUL I. ATKINSON
BY ROBERT D. STRAIT
ATTORNEYS

United States Patent Office 3,202,968
Patented Aug. 24, 1965

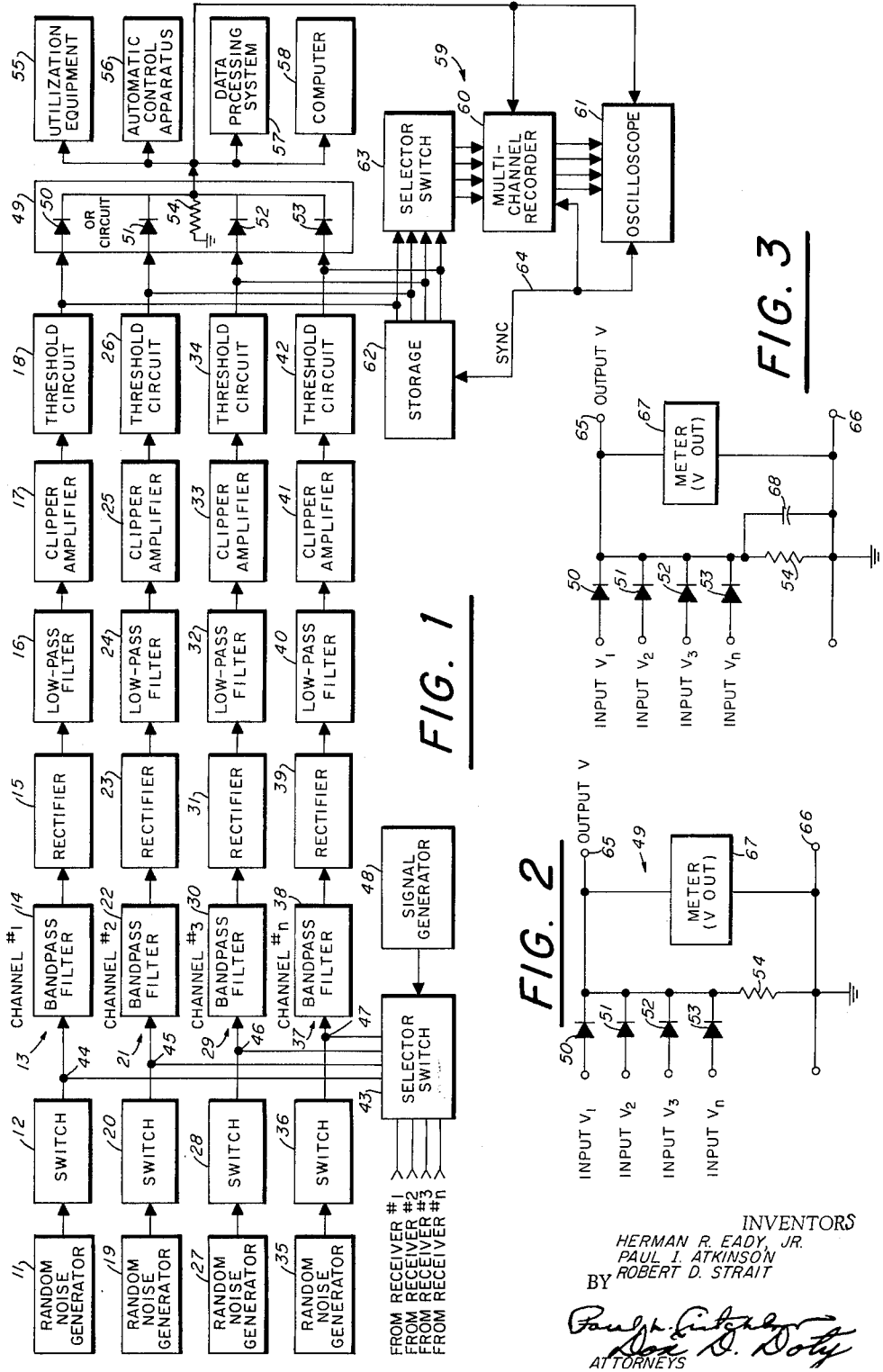

3,202,968
SIGNAL MONITORING INSTRUMENT
Herman R. Eady, Jr., La Mesa, Robert D. Strait, San Diego, and Paul I. Atkinson, Los Altos, Calif., assignors to the United States of America as represented by the Secretary of the Navy
Filed Aug. 25, 1961, Ser. No. 134,058
6 Claims. (Cl. 340—172)
(Granted under Title 35, U.S. Code (1952), sec. 266)

The invention described herein may be manufactured and used by or for the Government of the United States of America for governmental purposes without the payment of any royalties thereon or therefor.

The present invention relates generally to multiple data monitoring systems and in particular is a method and means for continuously combining and monitoring a plurality of independent data channel output signals and selecting therefrom the single output signal having the greatest amplitude at any given instant without loss in signal detectability or fidelity. In addition, the subject invention is a method and means for selecting and displaying said single output signal from those channel output signals which exceeds a predetermined amplitude, noise level, or threshold, as desired.

A common problem involved in using electronic search, telemetering, control apparatus, data processing systems and computer operations is detecting a unique signal which may occur in any of a number of independent channels or other signal sources. In many cases, the unique signal occurs in a background of noise which may mask it sufficiently to reduce considerably the probability of its detection, especially by a human monitor. Ordinarily, to detect signals in such systems, the monitoring operator or device must continuously survey the outputs and report when any one or several of them departs from the normal noisy or other environmental state.

In the past, time-sharing and various and sundry scanning techniques have been employed to monitor a plurality of signals from output channels or other signal sources. However, in many instances, especially where the number of signals to be monitored is large, less than optimum signal monitoring results, a loss in signal detectability occurs, all signals are not monitored simultaneously—thereby increasing the possibility of missing important signals coming through on channels not being scanned at that moment, the number of signals being monitored is substantially limited for most practical purposes, and usually the designed output is something less than the desired full potential of the monitoring system.

The subject invention overcomes most of the disadvantages of the aforementioned prior art by employing a parallel processing technique which considerably increases the number of channel outputs or other signals that can be monitored by a single operator or device. Consequently, substantial advances in the design of associated electronic data handling systems are made possible. For example, it is now possible to simultaneously and continuously monitor thousands of output signals, such as may occur in the signal processing of ultra long range sonar or other echo-ranging or passive electronic search systems, by means of properly combining said output signals in the subject invention and thus reduce the display problem to manageable proportions. Moreover, this is done without impairing the detectability and subsequent processing thereof.

It is, therefore, an object of this invention to provide an improved method and means for monitoring a plurality of electrical signals.

Another object of this invention is to reduce the display of a large number of channel output signals to manageable proportions without imparing the detectability or subsequent processing thereof.

Another object of this invention is to provide a method and means which facilitates signal processing in ultra-long range sonar systems.

A further objective of this invention is to provide an improved parallel signal processing circuit that is sufficiently free of switching noise to materially increase the signal-to-noise ratio of monitored signals being fed as inputs to associated electronic equipment.

Still another object of this invention is to convert a plurality of input signals into a single output signal having an amplitude equal to or proportional to the greatest amplitude of any one of said plurality of input signals at any given instant.

Another object of this invention is to increase the speed and accuracy of detecting, determining, and identifying a predetermined input signal from among a plurality of essentially non-similar input signals.

A further objective of this invention is to provide an improved data processing system for automatically reading out the voltage level of a number of incoming electrical signals in terms of a single meaningful output analog signal relative thereto.

A further objective of this invention is to provide an improved method and means for monitoring the output of sonar, radar, and other electronic search apparatus which reduces human operator fatigue and the possibility of error resulting therefrom.

Another object of this invention is to provide an improved technique for increasing the number of channels that can be monitored by a single operator or device.

Another object of this invention is to provide an improved data handling system.

Another object of this invention is to provide a method and means for retaining in a data display a signal that is correlated with the highest amplitude of the output signals from a plurality of channels at any given instant and identifiable therewith.

A further objective of this invention is to provide an improved method and means of reducing the size of display of incoming signals.

Another object of this invention is to provide an improved method and means for distinguishing an intelligence signal from a plurality of incoming signals containing noise or other spurious signals.

Another object of this invention is to provide a circuit for continuously selecting the maximum output signal from a large plurality of signals received from associated electronic or electrical apparatus.

Another object of this invention is to provide an analog OR circuit that may be easily and economically manufactured and maintained.

Other objects and many of the attendant advantages of this invention will be readily appreciated as the same becomes better understood by reference to the following detailed description when considered in conjunction with the accompanying drawings wherein:

FIG. 1 is a block diagram of an exemplary embodiment of the signal processing system of the present invention.

FIG. 2 is a schematic diagram of an exemplary preferred embodiment of the OR circuit of this invention.

FIG. 3 is a schematic diagram of another exemplary preferred embodiment of the OR circuit of this invention.

FIG. 4 is a graphical representation of oscillograph traces of exemplary output signals from a plurality of associated equipment channels and the output trace from the OR circuit of this invention.

FIG. 5 is a graphical representation of the false alarm rate versus signal-to-noise ratio for fifty percent signal detection, which may be utilized for appropriate selection of pertinent design factors that produce optimum operational conditions in the subject invention under certain circumstances.

FIG. 6 represents a cascaded version of the OR circuits of FIGS. 2 and 3 which may be incorporated in the device of FIG. 1 as a substitute for the OR circuit shown therein.

Referring now to FIG. 1, there is shown an overall system for combining multiple data channel signals or other appropriate input signals as desired, including means for calibrating and adjusting same in order to provide operation thereof. Said system is shown as comprising a first channel having a random noise generator 11 with its output coupled through a switch 12 to the input of a signal shaping train 13. The aforesaid input to signal shaping train 13 is applied to a bandpass filter 14, the output of which is fed to a rectifier 15 which, in turn, has its output fed to a low pass filter 16. A clipper amplifier 17 receives its input from the output of the aforesaid lowpass filter 16 and its output is applied to a manually adjustable threshold circuit 18.

A second channel is shown as having a random noise generator feeding its output through a switch 20 to another signal processing train 21. Like in signal shaping train 13, signal processing train 21 includes a bandpass filter 22 and has its input from switch 20 applied thereto. The output from bandpass filter 22 is applied to a rectifier 23, the output of which is fed to a lowpass filter 24 and a clipper amplifier 25 to a threshold circuit 26.

Like in the two preceding channels, a third channel has a random noise generator 27 feeding into a switch 28 which has its output applied to a signal shaping train 29. Also, like in the aforementioned channels, signal shaping train 29 has its input fed to a bandpass filter 30, the output of which is fed through a rectifier 31, a lowpass filter 32, and a clipper 33 to a threshold circuit 34.

It should be understood that although only three channels have been specifically numbered in the drawing and defined herein, that any number thereof may be incorporated in the subject invention as desired from the teaching herein presented, and so doing would obviously be well within the purview of the skilled artisan. However, for the purpose of clarity a fourth which is substantially identical to the three preceding channels is also shown and described. Said fourth is herein defined as an nth channel and, accordingly, includes a random noise generator 35 having its output fed through a switch 36 to a signal shaping train 37 and, in particular, through series connected bandpass filter 38, rectifier 39, lowpass filter 40, clipper amplifier 41, and threshold circuit 42.

Input signals from associated electronic equipment, such as, for example, sonar apparatus, are respectively applied through an appropriate selector switch 43 to the inputs of each of the aforementioned bandpass filters contained therein. Of course, the subject system must have channel switches equal in number to the total number of input signals applied thereto. Thus, as shown herein, an input signal from receiver 1 would be applied to a mixing junction 44 of channel 1, receiver input signal No. 2 would be applied to mixing junction 45 of input channel No. 2, input receiver 3 would have its signal applied to mixing junction 46 of channel 3 and the nth input signal from the nth receiver would be applied to mixing junction 47 of the nth channel. A signal generator 48 adapted to generate any predetermined type signal such as, for instance, a sine wave, a square wave, or any other appropriate waveform has its output applied to selector switch 43, which, in turn, may apply same to each of said channels either separately, collectively, or in any combination thereof. Likewise, selector switch 43 should be so designed as to enable any one or all of the input signals from the receivers to be applied to said channels as is desired.

The output signals from each of the aforesaid channels are connected to a large number of inputs of an analog OR circuit 49. Actually, as shown, the outputs of channels 1, 2, 3, and n are respectively connected to the anodes of a diode 50, a diode 51, a diode 52 and a diode 53. The cathodes of each of said diodes are interconnected and coupled through a resistor 54 to ground. The interconnection of the cathodes of said diodes actually constitutes the output of OR circuit 49. This output is then applied to a utilization equipment 55, an automatic control apparatus 56, a data processing system 57, a computer or counter 58, or any other appropriate electronic equipment associated therewith. The output of OR circuit 49 is also applied to a readout 59 consisting of a multi-channel recorder 60 such as a recording oscillograph or the like, and an oscilloscope 61.

The respective outputs of the aforesaid channels are also fed into a storage 62 and through an appropriate selector switch 63 to multi-channel recorder 60 and therethrough to oscilloscope 61. A synchronization conductor 64 may be interconnected between storage 62, multi-channel recorder 60, and oscilloscope 61, and may also be extended onto computer 58 and any other associated equipment as necessary.

Referring now to FIG. 2, a detailed embodiment of the OR circuit incorporated in FIG. 1 is illustrated. In this embodiment, however, the inputs thereto are shown as input voltages 1, 2, 3, and n, which may be considered as representing any appropriate input signals which it is desired to monitor. As before, these input voltages are applied to the anodes of diodes 50, 51, 52 and 53, respectively. Also as before, the cathodes of said diodes are interconnected and coupled to ground through resistor 54. It can be seen then that the output of this OR circuit may be taken from a terminal 65 connected to the interconnection of said diode cathodes and the terminal 66 connected to ground. An output voltage meter 67 of any preferred appropriate type is connected across the output of the OR circuit in this case for reasons which will be discussed in connection with an explanation of the operation thereof presented subsequently.

FIG. 3 depicts another preferred embodiment of the OR circuit of this invention. With the exception of capacitor 68 being connected across resistor 54, this OR circuit is identical with the OR circuit of FIG. 2 and accordingly is otherwise so referenced. With respect to each of the aforementioned OR circuits it should be understood that the number of inputs thereto the number of respective diodes therein may be varied as necessary to accomplish the monitoring of any number of signals. This is true whether said number of signals to be monitored are two, two-hundred, or any other quantity thereof.

In the devices of FIGS. 1, 2 and 3, the components incorporated therein are all conventional per se, and it is their unique arrangement and interaction that produces a new and useful result and constitutes this invention.

Although conventional diodes have been depicted in the figures of the drawing, it should be understood that any other operationally comparable devices may be substituted therefor. Such devices, for instance, may include the type that transmits or amplifies a signal when the polarity across the input portion thereof is in one direction and does not transmit or amplify or does so to a lesser extent when said polarity is reversed. Also, included is the type that inherently has a high impedance to electrical current flow in one direction and a relatively low impedance to current flow in the opposite direction. Thus, for example, semi-conductor and super-conductor devices, selenium rectifiers, transistors, or any other appropriate devices may be employed because so doing would obviously be within the purview of one skilled in the art in the light of the teachings herein presented.

Briefly, the operation of the device of FIG. 1 is as follows:

When acting as a data processor and signal monitor, input signals are received from the various outputs of the associated electronic equipment and are applied to selector switch 43 which may be manually manipulated to supply one or more of said input signals to one or more corresponding channels, respectively.

Hence, any of said input signals may be monitored individually, collectively, or in any other desired concerted arrangement. When, so used, switches 12, 20, 28 and 36 are manually opened to prevent random noise generators 11, 19, 27 and 35 from supplying noise signals to their respective channels. Bandpass filters 14, 22, 30 and 38 act as the input members to the signal shaping train portion of channels 1, 2, 3 and $n$, respectively; hence, they are so designed as to have center frequencies which correspond to their tone input signal frequency. Accordingly, each of said bandpass filters may have different center frequencies; however, preferably all should have the same band width. In all of said channels, the output of each bandpass filter is rectified and filtered in a lowpass filter to obtain a direct current envelope signal. This signal is then clipped and adjusted by amplification in such manner as to provide equal root mean square output voltages from each of the channels. These output voltages are then each thresholded in a threshold circuit and applied to diodes 50, 51, 52, and 53, respectively, of OR circuit 49. As a manner of practicality, the aforesaid threshold circuits may be omitted if so desired and a threshold device may be connected to the output of OR circuit 49 instead, in event so doing is preferred and will still effectively give the false alarm rate in any single channel or from the output of the OR circuit accordingly. Ordinarily, regardless of which system is used, the threshold level should be set and maintained with an accuracy of one-tenth db or better. The threshold level, of course, should be set so that an absolute minimum of noise would exist in the output signal therefrom. Unfortunately, perfection in this area is highly improbable because occasionally the background noise contains a signal which has a spike that exceeds said threshold level and is, therefore, included in the output signal of any or all of the aforesaid threshold circuits. Although the presence of such spurious, high amplitude noise signals may have a slight adverse effect upon the total operation of the subject device, when the subject system is calibrated, adjusted, and operated in accordance with the theoretical and mathematically defined procedures presented subsequently, for most practical purposes, optimum operation may be obtained because the aforementioned spurious noise signals and the effects thereof are negligible.

Although not necessarily an obligatory element, storage 62 is incorporated in this system in order to maintain the actual received signals in their original state which, in turn, facilitates subsequently obtaining the location of the channel containing the information or intelligence signals and identifying and evaluating same.

In order to substantially delete the aforementioned high amplitude spike noise signals from the output of the subject invention, and in order to substantially balance and equalize all of the input signals applied to OR circuit 49, a self-contained calibration system is incorporated therein. Structurally speaking, this calibration system includes the random noise generators and the switches which are connected to the inputs of their respective bandpass filters in each of the channels. In addition, a signal may be introduced by signal generator 48 to any or all of the existing channels through proper manipulation of appropriate selector switch 43. Selector switch 43, of course, as well as the other aforementioned switches should be so designed as to allow any single input signal or plurality of input signals, or any combination thereof to be applied to each and all of said channels. Obviously, since during calibration it is desired to simulate actual predetermined operating conditions, the calibration signal from signal generator 48 is usually mixed with the output noise signals from random noise generators 11, 19, 27 and 35 before being applied to their repsective channels. Typically, the calibration signal from signal generator 48 is a sinusoidal carrier pulsed with a rectangular envelope. The signal frequency employed is ordinarily dependent upon the channel being calibrated at any given instant and is adjusted to match the center frequency thereof. It has been found that the duration of the pulse therefrom should be such that $TW=1$, where T is the pulse length in seconds and W is the channel band width in cycles per second. The choice of this particular typical example is not intended to imply a limitation of the technique that must be used in the calibration process, and it should be understood that the use of other carrier and intelligence signal waveforms, duration of pulses, and frequency may be employed in order to simulate conditions and the input signals that will be received from the receivers of associated sonar systems or other electronic equipment.

During calibration, balance of the aforesaid channel output signals is indicated by multi-channel recorder 60 and oscilloscope 61 connected thereto by means of proper manipulation of selector switch 63. If unbalanced at any given time, balance may be effected by the proper manual adjustment of each of the clipper amplifier and threshold circuits in such manner as to substantially eliminate noise of any desired amplitude therefrom while passing the calibration intelligence signal originating at signal generator 48.

An additional calibration check which may be employed if so desired is to count by means of computer 58 the number of signals occurring at the output of OR circuit 49 and compare this number with the number of calibration intelligence signals originating at signal generator 48 for any predetermined period of time to ascertain if the number thereof are the same; if not, readjustment of the amplification and clipping level of the clipper amplifiers or further regulation of the threshold level of the threshold circuits may be in order.

Once it has been determined that the subject system is calibrated to the operator's satisfaction, the output thereof may be fed to any associated equipment requiring a single monitored input signal, such as, for example, utilization equipment 55, automatic control apparatus 56, data processing system 57, computer 58, as well as any other appropriate electronic or electrical apparatus, as well as the aforementioned multi-channel recorder 60 and oscilloscope 61.

Hence, it can be seen that the subject invention facilitates monitoring an extremely large plurality of incoming signals that may have an adverse noise background and converts the indicia of these signals from one which would be practically impossible for any given operator or even a number of operators to monitor with any reasonable degree of competency and accuracy to a single output signal which may be easily monitored by a human operator or other monitoring device.

The key circuit which makes such monitoring possible is herein called the OR circuit. Although this circuit is shown in combination of elements of FIG. 1 and briefly mentioned in connection with the explanation thereof, it will now be described and explained further and in detail in conjunction with FIGS. 2, 3 and 4.

Referring now to FIGS. 2 and 3, there is shown the plurality of input terminals which have or are adapted to have input voltages $V_1$, $V_2$, $V_3$, and $V_n$, applied thereto. These input terminals are respectively connected to the anodes of diodes 50, 51, 52, and 53. The cathodes thereof are all interconnected and coupled to an output terminal 65. As previously mentioned, said cathodes are also connected through resistor 54 to ground which in turn is coupled to an output terminal 66. An output meter 67 which may, for instance, be an oscilloscope, an oscillograph, a volt meter, or any other conventional output meter is connected across output terminals 65 and 66 in order to act as a readout means to provide the graphical representation depicted in FIG. 4 and, thus, facilitate describing the operation of the subject OR circuit. As can readily be seen, the embodiment of FIG. 3 is identical with the embodiment of FIG. 2 with the exception that capacitor 68 is connected across resistor 54 for reasons which will be explained below.

The operation of the subject OR circuit is quite simple. Assuming that the inputs $V_1$, $V_2$, $V_3$, and $V_n$ are positive voltages and are similar to the signals respectively received from receivers 1, 2, 3, and $n$, graphically illustrated in FIG. 4, corresponding voltages will be present at each of the cathodes of their respective diodes. But if, for instance, the voltage of $V_1$ is higher than that of $V_2$, $V_3$, $V_n$, the bias on the latter three diodes will be such as to prevent their conduction and hence only the voltage $V_1$ will be present as the output voltage. Likewise, if input voltage $V_2$ is greater at any given instant then the input voltages of $V_1$, $V_3$ and $V_n$, diodes 50, 52, and 53 will accordingly be cut off and only voltage $V_2$ will be present in the output. This is due to the fact that all of the diodes other than the diode having the largest input voltage is automatically biased by the highest input voltage present at any given instant and are thereby cut off allowing only said high voltage signal to pass. Because of this, the output voltage which is read by the output meter always represents input voltage that is greatest. Referring now to FIG. 4 with the last mentioned explanation in mind, it can be seen that the input voltage from receiver No. 2 timely provides a high-peaked signal having the highest amplitude; that is, a signal which has an amplitude which is higher than any of the input signals from the other three receivers, and that is the signal which constitutes the instantaneous output signal from the subject OR circuit. The graphical representation of the output of the OR circuit shown in FIG. 4 is, accordingly, intended to represent the highest amplitude of any of the signals received from receivers Nos. 1, 2, 3, and $n$ at any given time. Although, this is true for any given instant in a continuous time, and is intended to be shown in all the graphical representations of FIG. 4, it can be seen more clearly in exaggerated form in connection with the aforementioned signal received from receiver No. 2 and the corresponding output signal from the OR circuit. This exemplary exaggerated condition shows only one such signal, but it should be understood that any number thereof may occur during actual operation at either higher or lower amplitude levels. Moreover, it should be understood that with proper adjustment of the aforementioned clipper amplifiers and threshold that it is possible to delete any or all of the signals from either the receivers or the OR circuit except those whose amplitude exceeds a predetermined threshold level. Thus, for instance, if an intelligence signal or a number of intelligence signals are present in or accompanied by a large amount of undesirable noise signals existing below the aforesaid threshold level, they may be substantially eliminated from the output of the OR circuit. However, as mentioned in connection with the description with FIG. 1, such elimination of unwanted noise signals may be effected by thresholding the output signal of the OR circuit if so desired.

The operation of the device of FIG. 3 is very similar to that of FIG. 2 except that the output therefrom has slightly improved signal fidelity due to the fact that negative feedback does not occur at the interconnection of the cathodes of said diodes as a result of the fluctuating voltage across resistor 54.

FIG. 6 illustrates that a plurality of OR circuits may be combined in a cascaded manner to provide improved monitoring operations of an extremely large number of input signals. This arrangement tends to reduce insertion losses, facilitates making cable connections, and reduces to a considerable extent many of the channel matching problems. Incorporation thereof in the device of FIG. 1 as a substitute for the OR circuit 49 shown therein may be advantageous under certain circumstances. Structurally, the input signals are applied to each of OR circuits 68, 69 and 70, which are identical to either the OR circuits of FIGS. 1 and 2. The outputs thereof may then be respectively amplified by amplifiers 71, 72 and 73 and applied as a plurality of inputs to another similar OR circuit 74. Only a small group of said OR circuits are so combined in FIG. 6, but the arrangement of FIG. 6 should only be considered as representative and any predetermined pertinent number of OR circuits may be used. Operationally, this arrangement provides substantially the same results as the embodiments of FIGS. 1 and 2 and includes the aforementioned advantages in addition.

Mathematically, the theory of operation of the subject invention may be expressed as follows:

Assuming for the purpose of this discussion that no intelligence signal is present and that the threshold level is such as to pass noise, the outputs of each of the channels consist of envelopes of narrow bands of random noise signals. According to S. O. Rice, in his article entitled "Mathematical Analysis of Random Noise," Bell System Technical Journal, vol. 24, page 76, January 1945, the probability density distribution of the envelope amplitude of noise is expressed:

$$p(R) = \left[\frac{R}{\psi_0}\right]\left[\exp\left(\frac{-R^2}{2\psi_0}\right)\right] \qquad (1)$$

where: $p(R)$=the probable density distribution of noise when R is greater than zero, and $\psi_0$=the total average power.

Then if $w(f)$=the power spectrum of noise, and letting:

$$x = R/\psi_0^{1/2}$$

and $$dx = dR/\psi_0^{1/2}$$

then by the change of variable technique $$p(x)dx = \left[\frac{R}{\psi_0}\right]\left[\exp\left(\frac{-R^2}{2\psi_0}\right)\right]dR$$

Substituting on the right side, the probability density of the variable $x$ is obtained; that is, the ratio of the envelope value to the root mean square value of the noise and $$p(x) = x \exp\left(\frac{-x^2}{2}\right) \qquad (2)$$

The probability that noise alone will exceed some criterion level is the integral of Equation 2 from $x_c$ to infinity and is expressed mathematically as:

$$P_{FA} = \int_{x_c}^{\infty} p(x)dx = \exp\left(\frac{-x_c^2}{2}\right) \qquad (3)$$

where:

$P_{FA}$=probability of false alarm, and
$x_c$=the criterion level.

It is now necessary to determine the probability that the amplitude of an intelligence signal pulse plus noise will exceed the criterion level. When the length of the sinusoidal pulse is approximately equal to $1/W$, where W is the bandwidth of the noise, the signal may be considered roughly as a one random sample of the distribution of the envelope of signal plus noise. The question then is concerned with the probability of one sample of signal plus noise exceeding the criterion level. S. O. Rice in his article entitled, "Mathematical Analyses of Random Noise," Bell System Technical Journal, vol. 24, page 101, January 1945, gives the probability density distribution of the envelope of a sine wave plus Gaussian noise as:

$$p(v) = v\left[\exp\left(\frac{-v^2 a^2}{2}\right)\right] I_0 \ (av) \quad (4)$$

where:

$$v = \frac{R}{\psi_0^{1/2}}$$

and $$a = \frac{S}{\psi_0^{1/2}}$$

and $s =$ the peak value of the sine wave, and $I_0 \ (av)$ is a modified Bessel function of first kind of Order 0 and argument $av$.

To determine the probability of the signal-plus-noise sample exceeding the criterion level, Equation 4 is integrated from $v_c$ to infinity, where $v_c =$ the criterion level. The result is called the probability of detection $P_D$ and is expressed:

$$P_D = \int_{V_c}^{\infty} p(v) \, dv \quad (5)$$

Equations 3 and 5 then give the probability of false alarm, $P_{FA}$, and the probability of detection, $P_D$, for the single-channel case.

Considering now the case of $n$ noisy channels, all having the same average and root mean square noise levels, and one of them containing an intelligence signal. Let us assume for the purpose of this consideration that each of the channels is monitored by a threshold device as is illustrated in the system embodiment of FIG. 1. The question then arises as to what the equations are for the $P_D$ and $P_{FA}$ for the total system. Since the signal occurs in only one channel at a time due to the fact that it contains some discrete frequency which will only be passed and processed by the predetermined bandwidths of one thereof, the probability of detection, $P_D$, remains the same. The probability of a false alarm, which will now be denoted $P_{FA_n}$ to indicate that it is the probability of a false alarm for the whole system, will of course, have changed. If $P_{FA}$ is the probability of a false alarm in one channel, then the probability of at least one false alarm in $n$ channels is:

$$1 - (1 - P_{FA})^n$$

Substituting from Equation 3 we find $$P_{FA_n} = 1 - \left[1 - \exp\left(\frac{-x_c^2}{2}\right)\right]^n \quad (6)$$

Considering now the case of $n$ noisy channels which are monitored by an OR circuit without the benefit of thresholders preceding it, but, rather, with one threshold device following it. Since the intelligence signal appears in only one channel and the OR circuit does nothing to alter the amplitude thereof, $P_D$ remains the same as in Equation 5. However, in order to determine the $P_{FA}$ for the output of the OR circuit, it is necessary to determine the probability density for $n$ independent channels of noise combined by maxima in the manner disclosed above. Approaching the problem generally, the $n$ independent channels may be considered as $n$ random variables having the same distributions. The question then arises as to what is the distribution of the maxima of these variables. Assuming the existence of $n$ (normalized) random variables (functions of time) distributed independently with the same density function $px$. New $n$ random variables $x_1, x_2, \ldots x_n$ are formed by arranging the original variables in increasing order at every instant of time. In particular, $x_n$ is the largest variable at all times and is thus analogous to the OR circuit output. Denoting the density function of $x_n$ by $f(x_n)$, the probability that $x_n$ will assume the value $x_0$ at a given instant can be written:

$$f(x_0) \, dx = n \left[\int_{\infty}^{x_0} p(x) \, dx\right]^{n-1} p(x_0) \, dx$$

In general, then, $$f(x_n) = n \left[\int_0^{x_0} p(x) \, dx\right]^{n-1} p(x_n) \quad (7)$$

To obtain the probability density for the maxima in $n$ independent Rayleigh distributed variables, simply substitute Equation 2 in Equation 7 thusly:

$$f(x_n) = n \left[\int_{\infty}^{x_n} x \exp\left(\frac{-x^2}{2}\right) dx\right]^{n-1} x_n \exp\left(\frac{-x_n^2}{2}\right)$$

$$f(x_n) = n \left[1 - \exp\left(\frac{-x_n^2}{2}\right)\right]^{n-1} x_n \exp\left(\frac{-x_n^2}{2}\right) \quad (8)$$

To arrive at $P_{FA_n}$ for the OR circuit case, integrate Equation 8 from $x_c$ to infinity.

$$P_{FA_n} = \int_{X_c}^{\infty} n \left[1 - \exp\left(\frac{-x_n^2}{2}\right)\right]^{n-1} x_n \exp\left(\frac{-x_n^2}{2}\right) dx_n$$

$$P_{FA_n} = 1 - \left[1 - \exp\left(\frac{-x_c^2}{2}\right)\right]^n \quad (9)$$

It can be seen that Equations 6 and 9 are identical, and this, of course, means that $P_{FA_n}$ is identical for both of the cases where the channels are thresholded individually before the OR circuit or in concert thereafter. It will be recalled that $P_D$ was also identical for both cases; therefore, since $P_D$ and $P_{FA_n}$ are the same for both cases, the use of the subject OR circuit incurs no loss in detectability.

Although the probability of a false alarm is useful in analysis and in comparing different processing techniques, an expression for false alarm rate is needed for operational purposes. Previously, the statement was made that the operator or detection device is looking for amplitude peaks which exceed some critical value called the criterion level and that noise alone will always exceed any criterion level some of the time. This situation can be appropriately defined by an expression which gives the number of times per unit time that the envelope of the noise will cross a given criterion level with positive slope. For a band of noise symmetrical about the sine wave frequency, $f_q$, the expected number, $N_R$, of times per second the noise envelope passes through a given level, R, with positive slope is given by S. O. Rice in his article entitled, "Statistical Properties of a Sine Wave Plus Random Noise," Bell System Technical Journal, vol. 27, page 125, January 1948, as:

$$N_R = \frac{(b_2)^{1/2}}{2\pi} \left[\begin{array}{c}\text{Probability density of}\\ \text{envelope at value R}\end{array}\right] \quad (10)$$

where, $b_2$ is the second moment of the power spectrum about the center frequency of the band of noise. If, for instance, Gaussian filters are used as the filters of the embodiment of FIG. 1, then:

$$b_2 = 4\pi^2 \sigma^2 \psi_0$$

where $\sigma =$ standard deviation = the root mean square of the noise level. Substituting this and the equation for the probability density of the envelope at the value R into Equation 10, the expected number, $N_R$, of times per second the envelope passes through a given level R may be expressed as:

$$N_R = \sigma(2\pi)^{1/2}\left\{\left[\frac{R}{\psi_0^{1/2}}\right]\left[\exp\left(\frac{-R^2}{2}\right)_0\right]\right\} \quad (11)$$

Similarly, the false alarm rate for the subject OR circuit may be obtained from Equations 8 and 10 as follows:

$$N_{x_{nc}} = \sigma(2\pi)^{1/2}\left\{n\left[1 - \exp\left(\frac{-x_{nc}^2}{2}\right)\right]^{n-1} x_{nc} \exp\left(\frac{-x_{nc}^2}{2}\right)\right\} \quad (12)$$

where $x_{nc}$ is the criterion level.

Referring now to FIG. 5, there is shown the practical relationship between detectability in terms of signal-to-noise ratio required for fifty percent detection and the false alarm rate, with the number of channels as the parameter. The ordinate, $f(x_{nc})$, which may be written $$f(x_{nc}) = \frac{N_{x_{nc}}}{(b_2/2\pi\psi_0)^{1/2}}$$

is directly proportional to the false alarm rate, the constant $b_2/2\pi\psi_0^{1/2}$ being determined by channel bandwidth and root mean square noise level. The signal-to-noise ratio was chosen for the abscissa because of its widespread use in considering and analyzing acoustical and other systems, both from the viewpoint of detection theory and from the practical viewpoints of design and operation.

The results for FIG. 5 were obtained theoretically as follows: $f(x_{nc})$ was determined from Equation 8 for several values of $x_{nc}$ and for 1, 4, 300 and 4500 channels. These same values of $x_{nc}$ were used as the lower limits of integration in Equation 5, the resulting probabilities of detection were set equal to 0.5, and the corresponding values of signal-to-noise ratio in the individual channels, $a = s/\psi_0^{1/2}$, were determined.

FIG. 5 may be utilized in several ways. If the attainable signal-to-noise ratio and maximum allowable false alarm rate for a system are known, the figure may be used to estimate the maximum number of channels which can be combined are known, the figure may be used to estimate the false alarm rate that will be observed.

Obviously, many modifications and variations of the present invention are possible in the light of the above teachings. It is, therefore, to be understood, that within the scope of the appended claims, the invention may be practiced otherwise than as specifically described.

What is claimed and desired to be protected by Letters Patent of the United States is:

1. An instrument for combining and monitoring a plurality of electrical input signals and transforming same into a unitary electrical signal having an amplitude substantially equal to that of the one thereof having the largest amplitude comprising in combination, a plurality of diodes equal in number to the number of input signals to be monitored, said diodes each having an anode and a cathode, means respectively connected to the anodes of said diodes for shaping each of said plurality of input signals in accordance with a predetermined program, means interconnecting each of the cathodes of said diodes for combining the electrical signals therefrom, a ground means, a reactance means coupled between the interconnected cathodes of said diodes and said ground means, means coupled to the outputs of said signal shaping means and said electrical signal combining means for recording and displaying the output signals therefrom simultaneously, means for calibrating said input signal shaping means and said output signal recording and displaying means, means for receiving said plurality of input electrical signals from associated electrical equipment, means connected to said signal shaping means, said calibration means, and said input signal receiving means for selectively applying the received input signals and the output calibration signals therefrom thereto either individually or collectively, and utilization equipment electrically coupled to the aforesaid signal combining means for response to said unitary electrical signal.

2. A signal monitoring instrument comprising in combination, conductor means for receiving a plurality of electrical input signals, a plurality of channels for respectively shaping a plurality of signals similar in number to the aforesaid plurality of electrical input signals, each of said channels comprising a random noise generator, a switch connected to the output of said random noise generator, a bandpass filter connected to said switch, a rectifier coupled to the output of said bandpass filter, a lowpass filter coupled to the output of said rectifier, a clipper amplifier connected to the output of said lowpass filter, and a threshold circuit connected to the output of said clipper amplifier, means for generating a signal having a predetermined waveform, a selector switch connected to the inputs of the bandpass filters of each of said channels, to said generating means, and to the aforesaid conductor means for selectively and respectively supplying said predetermined waveform signal and said received plurality of electrical signals therefrom thereto, means connected to the threshold circuit of each of the aforesaid plurality of channels for continuously converting the plurality of shaped signals therefrom into a single signal having an amplitude equal to that of the one thereof having the greatest amplitude, and means coupled to the output of said converting means for reading out said single signal.

3. The device of claim 2 wherein said means connected to the threshold circuit of each of the aforesaid plurality of channels for continuously converting the plurality of shaped signals therefrom into a single signal having an amplitude equal to that of the one thereof having the greatest amplitude comprises, a plurality of diodes equal in number to said plurality of channels each of which has a cathode and an anode, input conductor means respectively connecting the output of each of said channels with the anode of each of said diodes, output conductor means interconnecting each of the cathodes of said diodes, a ground, and a resistor coupled between said interconnected cathodes of said diodes and said ground.

4. Means for combining and monitoring a plurality of electrical signals comprising in combination, means for shaping and adjusting within a predetermined voltage and frequency range each signal of said plurality of electrical signals, means connected to the output of said signal shaping and adjusting means for continuously converting said plurality of shaped and adjusted electrical signals into a single signal having a voltage amplitude proportional to that of the one electrical signal thereof having the greatest voltage amplitude comprising a plurality of unilateral conductors comparable in number to the number of said electrical input signals, said unilateral conductors having at least a pair of elements disposed for a relatively low electrical impedance in a conductive direction from one element to the other thereof and a relatively high electrical impedance in the opposite conductive direction from said other element to said one element, means connected to each of said other elements of said unilateral conductors for respectively supplying each of said plurality of electrical input signals thereto, means for electrically interconnecting each of said one elements of said unilateral conductors, a ground means, electrical impedance means coupled between said ground means and the aforesaid interconnected one elements, means connected to each of the other elements and the interconnected one elements of said plurality of unilateral conductors for selectively recording and displaying said plurality of electrical input signals and said unitary electrical output signal separately and collectively, and means connected to said interconnected one elements of said plurality of unilateral conductors for supplying the aforesaid electrical output signal therefrom to associated utilization equipment.

5. The device of claim 4 wherein said electrical impedance means between said ground means and the aforesaid interconnected one elements is a predetermined resistance.

6. The device of claim 5 further characterized by a capacitor connected in parallel with said predetermined resistance.

(References on following page)

References Cited by the Examiner
UNITED STATES PATENTS

| | | | |
|---|---|---|---|
| Re. 2,385 | 7/50 | Roper | 340—186 |
| 2,505,074 | 4/50 | Trevor | 328—137 |
| 2,570,431 | 10/51 | Crosby | 328—137 |
| 2,666,848 | 1/54 | Goodwin | 328—137 |
| 2,725,467 | 11/55 | Atwood | 328—137 |
| 2,775,693 | 12/56 | Berwin | 328—137 |
| 2,779,869 | 1/57 | Gerks | 340—172 |
| 2,813,262 | 11/57 | Garde et al. | 340—172 |
| 2,820,896 | 1/58 | Russell et al. | 340—172 |
| 3,018,442 | 1/62 | Goodman | 328—137 |
| 3,052,871 | 9/62 | Brinster et al. | 328—137 |
| 3,096,446 | 7/63 | Cohen | 328—137 |
| 3,124,792 | 3/64 | Thaler | 307—88.5 |

NEIL C. READ, *Primary Examiner.*